US005745100A

United States Patent [19]
Bates et al.

[11] Patent Number: 5,745,100
[45] Date of Patent: Apr. 28, 1998

[54] INPUT DEVICE POINTER REMAP REGION ON A COMPUTER DISPLAY

[75] Inventors: Cary Lee Bates, Rochester; Jeffrey Michael Ryan, Byron, both of Minn.

[73] Assignee: International Business Machines Corporation, Armonk, N.Y.

[21] Appl. No.: 955,625

[22] Filed: Oct. 2, 1992

[51] Int. Cl.⁶ .................................................. G09G 5/08
[52] U.S. Cl. .......................... 345/157; 345/123; 345/145
[58] Field of Search ........................... 340/709, 706, 340/712, 710, 721; 345/157, 156, 145, 123, 121, 118

[56] References Cited

U.S. PATENT DOCUMENTS

| | | | |
|---|---|---|---|
| 4,587,520 | 5/1986 | Astle | 340/709 |
| 4,887,230 | 12/1989 | Noguchi | 340/710 |
| 5,047,754 | 9/1991 | Akatsuka et al. | 340/710 |
| 5,075,673 | 12/1991 | Yanker | 340/710 |
| 5,155,806 | 10/1992 | Hoeber et al. | 340/706 |
| 5,164,713 | 11/1992 | Bain | 340/706 |

FOREIGN PATENT DOCUMENTS 3182926   8/1991   Japan.

*Primary Examiner*—Regina Liang
*Attorney, Agent, or Firm*—Curtis G. Rose; Steven W. Roth

[57] ABSTRACT

An input device pointer remapping region on a computer display is disclosed. When the input device pointer enters a region on a computer display, such as a rectangular scroll bar region, the pointer advances by jumping to a point within the region, such as the center of the region. Further movements of the pointer through the region are adjusted to increase the likelihood that the pointer will remain in the region. However, these adjustments are performed in such a manner as to not impede the travel of the input device through the region. This allows the input device pointer to stay within regions when appropriate, yet allows it to pass through regions unimpeded when the user so desires. This allows for the more efficient use of valuable display space, and can even allow a scroll bar to fit within a narrow window border. The operation of the pointer within the region is controlled by a remapping factor. Selection of the remapping factor can be modified from region to region. In addition to rectangular regions such as scroll bars and window boundaries, square and circular regions are supported. Complex regions, made up of more than one other regions, are also supported.

14 Claims, 21 Drawing Sheets

Remapping Factor = 0.5

0.5 < Remapping Factor < 1.0
Tracking Mode 0.0 < Remapping Factor < 0.5
Tracking Mode

| Region Type | Region ID | X1 | Y1 | X2 | Y2 | AX1 | AY1 | AY1 | AY2 | Remapping Factor | Sureness/ Tracking |
|---|---|---|---|---|---|---|---|---|---|---|---|
| 41 | 42 | 43 | | | | 44 | | | | 45 | 46 |

Region List 40

FIG. 3A

- 51 — Remapping On/Off
- 52 — Current Pointer Location
- 53 — Old Pointer Location
- 54 — Adjust Flag
- 55 — Current Region ID
- 56 — Region Calculation Values Common Remap Fields 50

Pointer Remapping   x Yes _ No
                    x Tracking _ Sureness
                    Remapping Factor 0.5

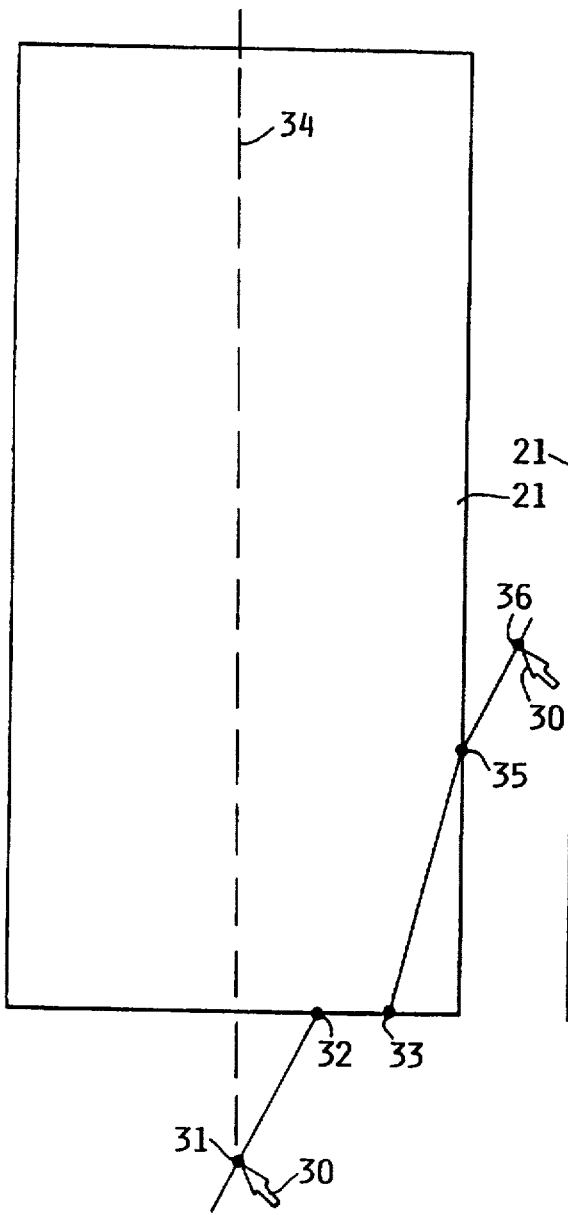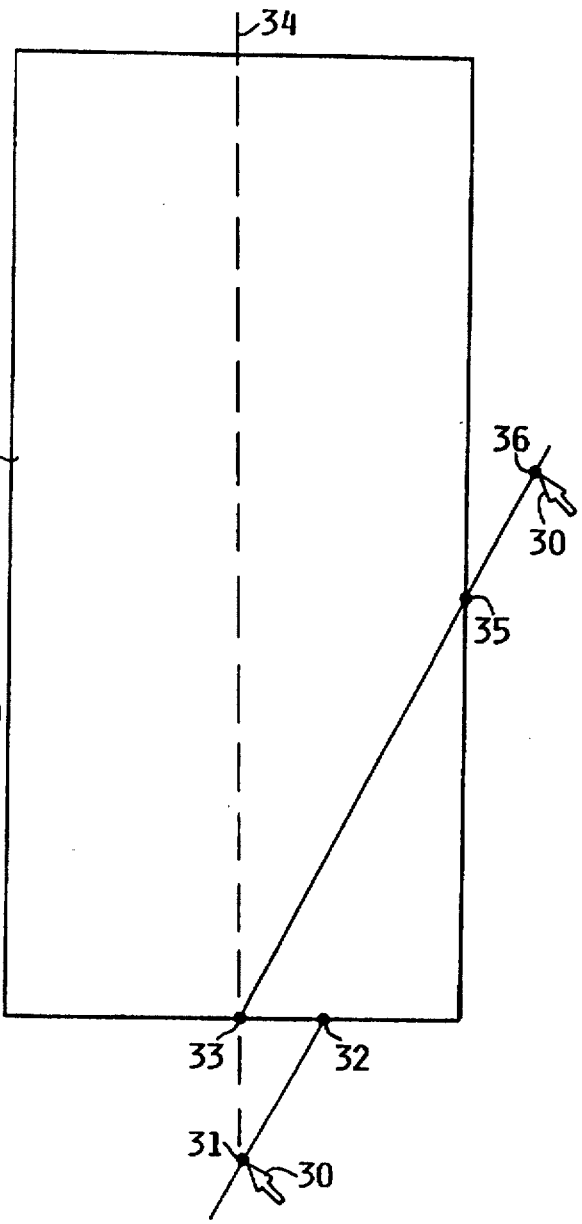
Tracking
FIG. 5A
Sureness
FIG. 5B

Tracking

Sureness

The Command Entry display allows you to enter commands to be processed by the system. Previous commands you have entered along with messages from the running of those commands are displayed in the history area above the command line.

Any commands that end in an error are automatically retrieved and displayed on the command line.

By positioning the cursor on a command or its associated messages in the history area and pressing the F4=Prompt function key, the prompt screen for the selected command is displayed.

You can retrieve previous commands that were run by pressing the F9=Retrieve function key. You can select a specific command to be run again by placing the cursor on that command or its associated

FIG. 7E

INPUT DEVICE POINTER REMAP REGION ON A COMPUTER DISPLAY

FIELD OF THE INVENTION

This invention relates to the data processing field. More particularly, this invention provides for the remapping of an input device pointer within a region on a computer display screen.

BACKGROUND OF THE INVENTION

Computer systems that use what is known as a "graphical user interface", first introduced to the market by Apple, and later adopted by Microsoft with its "Windows" program, and by IBM with OS/2 and Presentation Manager, are a fairly recent addition to the state of the art. One common feature of these graphical user interface systems is the appearance of one or more windows or viewports on the computer display screen. The data contained within these windows, as well as the appearance of the windows themselves, can be manipulated by the user through the use of an input device, such as a mouse. For example, if a user is using a word processing program to display a portion of a document in a window and wishes to move to a different portion of the document, he can put his mouse pointer on the scroll bar slider, press and hold the left mouse button, move the pointer to another point on the scroll bar, and release the mouse button in what is known as a "drag and drop" operation. The problem is that this operation requires a considerable amount of dexterity on the part of the computer perform successfully. Seemingly small movements of the mouse either right or left will cause the pointer to exit the scroll bar, thereby causing the scroll bar slider to snap back to where it was before the operation was initiated.

Other operations in the graphical user interface environment are just as difficult to perform as the scroll bar slider "drag and drop" operation. For example, resizing a window requires the user to move the mouse pointer to the narrow window border and perform another drag and drop operation. Moving the window requires selecting the window title bar and performing yet another drag and drop operation. Resizing clip art within a desktop publishing application such as Windows Draw! by Micrografx requires the user to find a "corner handle" on the clip art and hang onto it long enough to perform still another drag and drop operation.

The above problems may make less dexterous computer users feel like they are the ones being "dragged and dropped" as they try to navigate through today's graphical user interfaces, and they may in turn feel like "dragging and dropping" Windows and OS/2 through their office and out their window down to the street below. These computer users may dejectedly begin to think that graphical user interfaces are only intended for computer users under the age of 15 who have developed their rock-steady hands by spending countless hours in the video arcade.

SUMMARY OF THE INVENTION

It is a principal object of the invention to enhance the operation of a graphical user interface system.

It is another object of the invention to increase the likelihood that an input device pointer will stay within a region of a computer display.

It is another object of the invention to allow the input device to travel through a region of a computer display unimpeded.

These and other objects are accomplished by the input device pointer remapping region on a computer display disclosed herein.

An input device pointer remapping region on a computer display is disclosed. When the input device pointer enters a region on a computer display, such as a rectangular scroll bar region, the pointer advances by jumping to a point within the region, such as the center of the region. Further movements of the pointer through the region are adjusted to increase the likelihood that the pointer will remain in the region. However, these adjustments are performed in such a manner as to not impede the travel of the input device through the region. This allows the input device pointer to stay within regions when appropriate, yet allows it to pass through regions unimpeded when the user so desires. This allows for the more efficient use of valuable display space, and can even allow a scroll bar to fit within a narrow window border.

The operation of the pointer within the region is controlled by a remapping factor. The remapping factor is used to determine the point in the region the pointer jumps to, and the amount of adjustment made to the pointer's movement once it is in the region. Selection of the remapping factor can be modified from region to region. In addition to rectangular regions such as scroll bars and window boundaries, square and circular regions are supported. Complex regions, made up of more than one region, are also supported.

BRIEF DESCRIPTION OF THE DRAWING

FIG. 3A shows the region list of the invention.

FIGS. 5A–5B show the effect of the sureness and tracking parameters on the movement of an input device pointer through rectangular regions.

FIG. 7E shows how regions can be defined across text lines for a text editor.

DESCRIPTION OF THE EMBODIMENT

Figure 1:
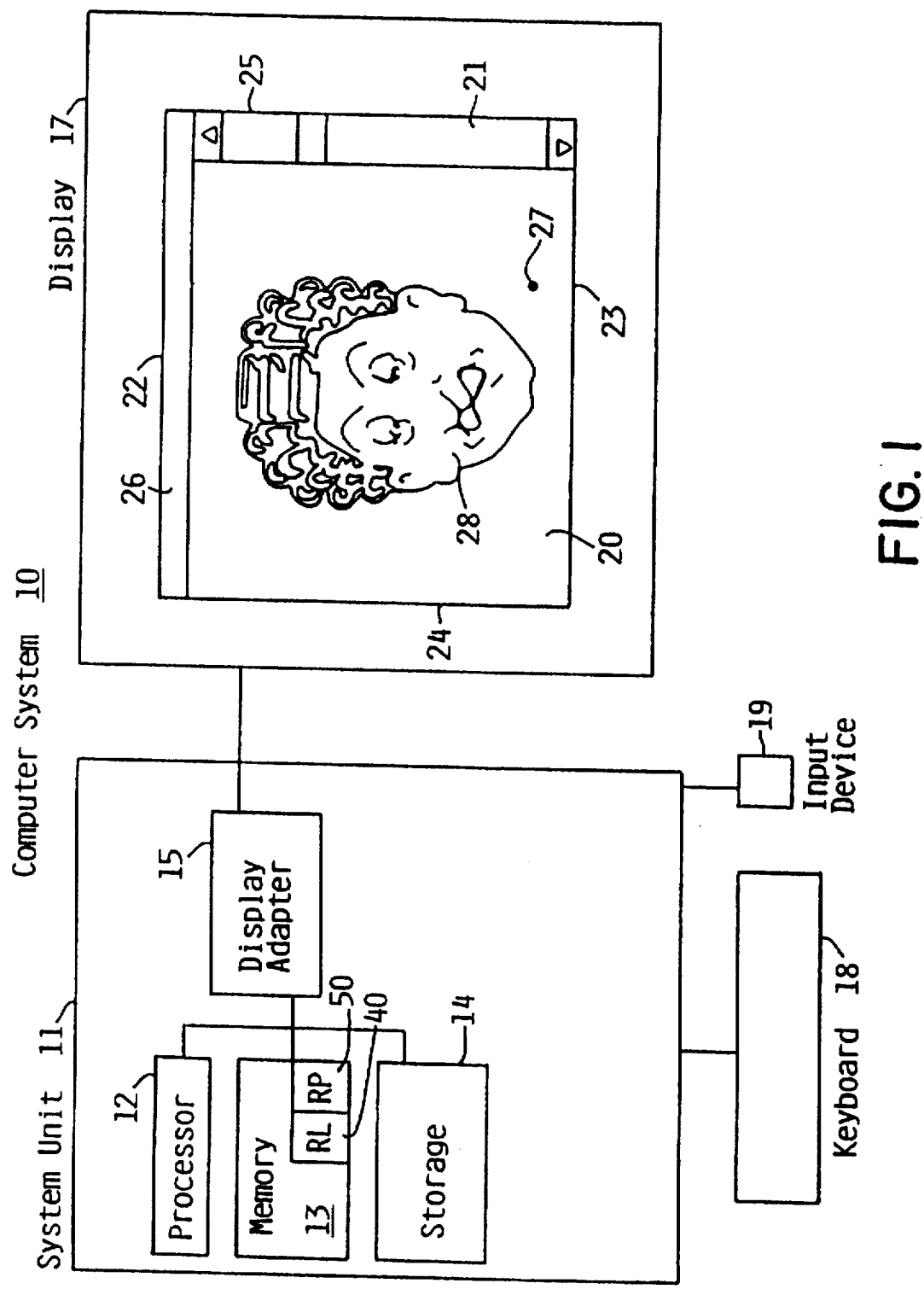
FIG. 1 shows a block diagram of the computer system of the invention.

FIG. 1 shows a block diagram of computer system 10 of the invention. Computer system 10 has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 8–12. Memory 13 contains region list 40 and region parameters 50.

In the preferred embodiment, computer system 10 is an IBM PS/2, where processor 12 is an Intel 80386 microprocessor. Display adapter 15 is an IBM 8515 display adapter, and display 17 is an IBM 8515 display. Input device 19 is preferably an IBM mouse but may also be a track ball, light pen, or other input device. Disk 14 contains operating system software, preferably OS/2 2.0 with Presentation Manager but optionally Microsoft Windows 3.1, as well as one or more Windows or OS/2 application programs shown as application program 20.

Display 17 contains the following areas that can be defined as "regions" for purposes of this invention. Scroll bar 21 is considered to be a rectangular region, as are top, bottom, left and right window borders 22–25 and title bar 26. Clip art 28 is considered a complex region made up of more than one region. Corner 27 of clip art 28 is a circular region. Input device 19 is also shown.

Computer system 10 could also be another type of computer system, whether it be another microcomputer such as an Apple Macintosh, a minicomputer such as an IBM AS/400, or a mainframe computer such as an IBM 390, and still fall within the spirit and scope of this invention. In addition, computer system 10 can be a microcomputer such as described above, connected to a larger computer system such as an IBM AS/400.

Figure 2A:
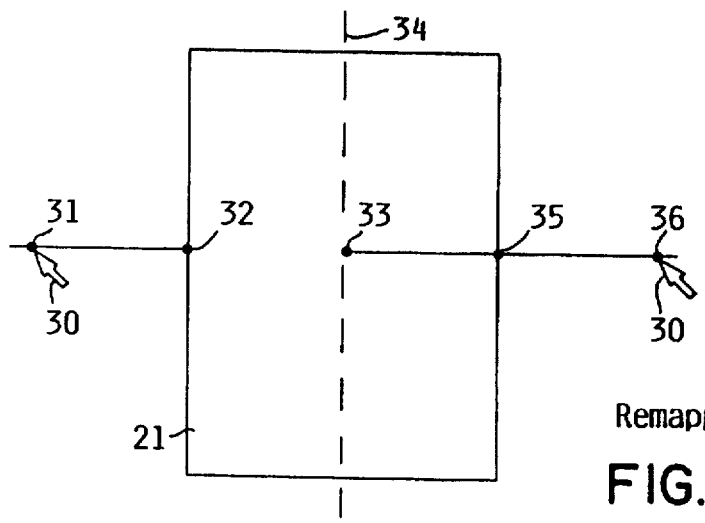
FIGS. 2A–2F shows how an input device pointer travels through a region on a computer display.

FIGS. 2A–2F show how input device pointer 30 travels through scroll bar region 21 on display 17 in the invention. In FIG. 2A, pointer 30 travels from point 31 in a conventional manner, until it reaches region boundary 32. When this occurs, pointer 30 advances through region 21 by jumping to a point A-(A*B), where A is the length of the region and B is the remapping factor. For FIG. 2A, the preferred embodiment of the invention, the remapping factor is set to 0.5, so pointer 30 advances to point 33—half way through region 21, as indicated by axis 34. As long as pointer 30 travels horizontally through vertically elongated rectangular region 21, such as when it travels from point 33 to region boundary 35, the location of pointer 30 will be adjusted by the remapping factor. For example, since the remapping factor is 0.5 in FIG. 2A, the movement of pointer 30 between points 33 and 35 will be adjusted by reducing the distance traveled by the input device by one half. The combined effect of advancing pointer 30 to point 33 (the center point of region 21) then adjusting the distance traveled between points 33 and 35 is what is referred to herein as "remapping", and has two results: 1) if the user is just traveling through the region (such as moving from point 31 to point 36) the time to travel through the region is unaffected by the invention. However, if the user is trying to stay within the region (such as to perform a drag and drop operation on the scroll bar slider), the invention increases the likelihood that he will stay within the region by making it harder to stray horizontally from the center point of the region. Vertical movement through a vertically elongated rectangular region is unaffected.

Figure 2B:
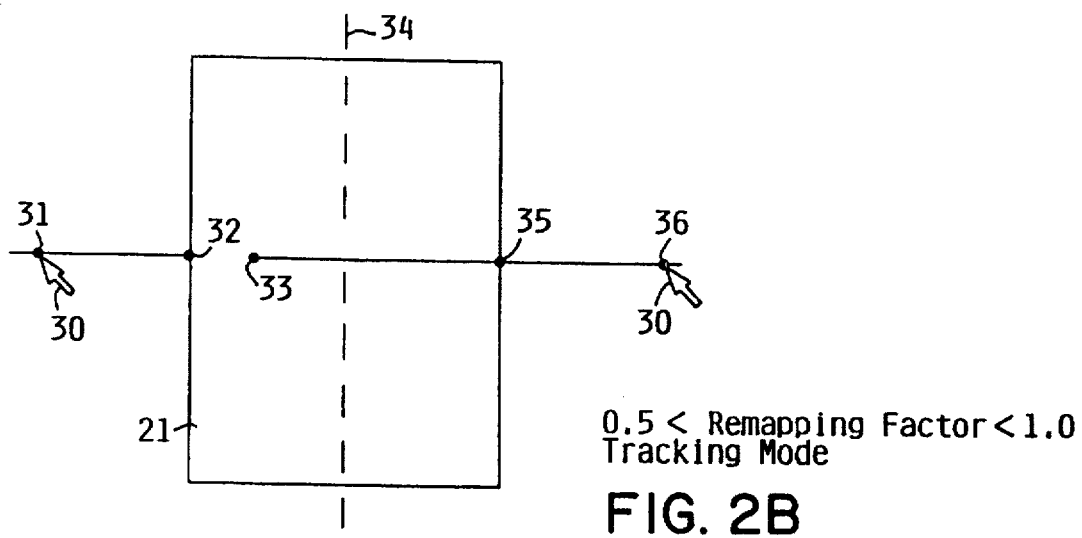

It may be desirable in some circumstances for some regions to set the remapping factor to a value less than or greater than 0.5. FIG. 2B shows the effect of setting the remapping factor greater than 0.5 but less than 1.0, when the "tracking" mode of the invention is used, as will be explained in more detail later. As before, pointer 30 travels from point 31 in a conventional manner, until it reaches region boundary 32. When this occurs, pointer 30 advances through region 21 by jumping to point A-(A*B), where A is the length of the region and B is the remapping factor. If the remapping factor is greater than 0.5, point 33 will be to the left of axis 34. As long as pointer 30 travels horizontally through vertically elongated rectangular region 21, such as when it travels from point 33 to region boundary 35, the location of pointer 30 will be adjusted by the remapping factor. The time of travel through the region is still unaffected if a remapping factor greater than 0.5 but less than 1.0 is used. If a remapping factor of 1.0 is selected, pointer 30 will not jump to a point in the region, and no adjustments would be made. Remapping factors between 0.5 and 1.0 may be desirable for regions like title bars, for which only a moderate increase in the likelihood of staying within the region is desirable. Remapping factors greater than 1.0 have no utility in the invention.

Figure 2C:
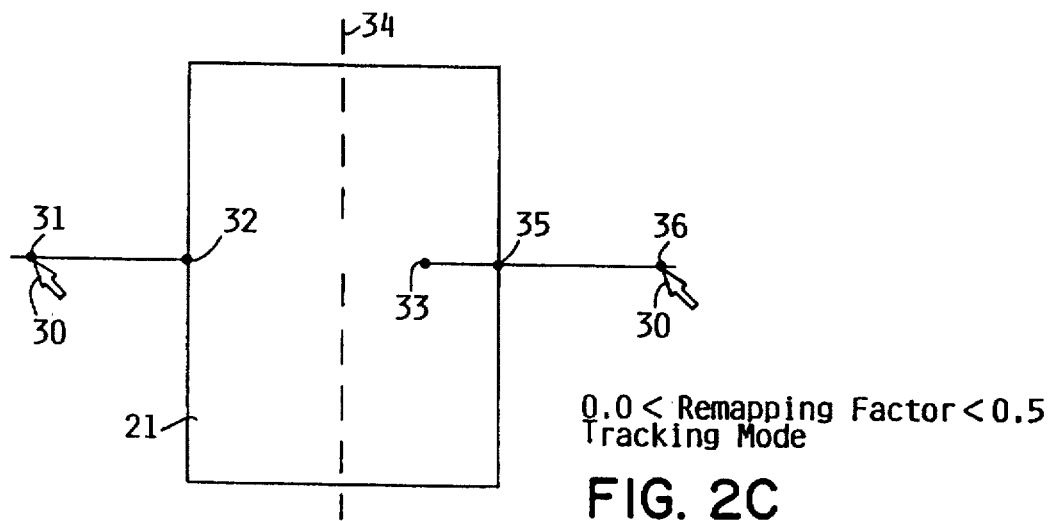

FIG. 2C shows the effect of setting the remapping factor less than 0.5, when the "tracking" mode of the invention is used. As before, pointer 30 travels from point 31 in a conventional manner, until it reaches region boundary 32. When this occurs, pointer 30 advances through region 21 by jumping to point A-(A*B), where A is the length of the region and B is the remapping factor. If the remapping factor is less than 0.5, point 33 will be to the right of axis 34. As long as pointer 30 travels horizontally through vertically elongated rectangular region 21, such as when it travels from point 33 to region boundary 35, the location of pointer 30 will be adjusted by the remapping factor. The time of travel through the region is still unaffected if a remapping factor greater than 0.0 but less than 0.5 is used. Note that a remapping factor 0.0 or less has no utility in the invention.

Figure 2D:
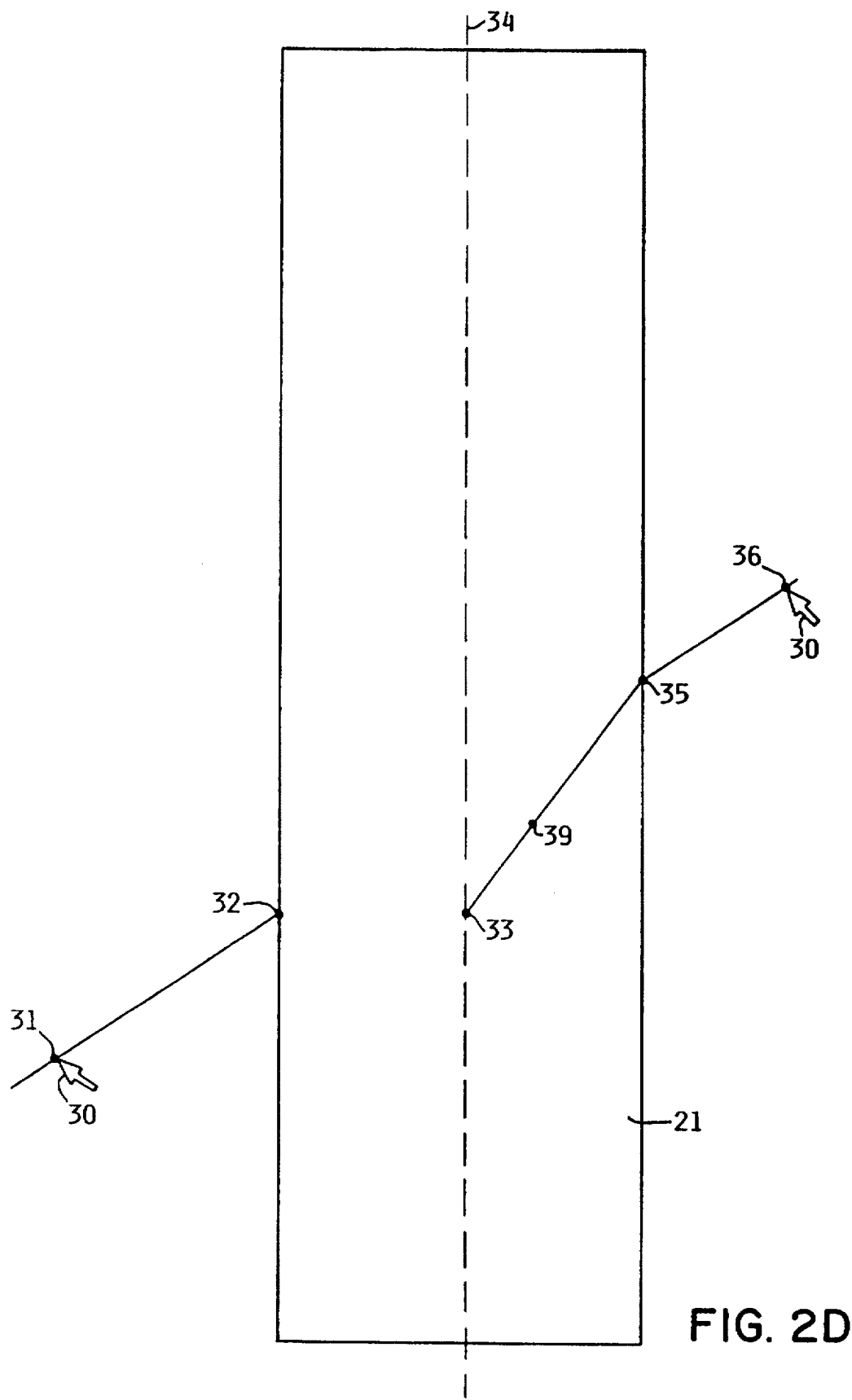
Figure 2E:
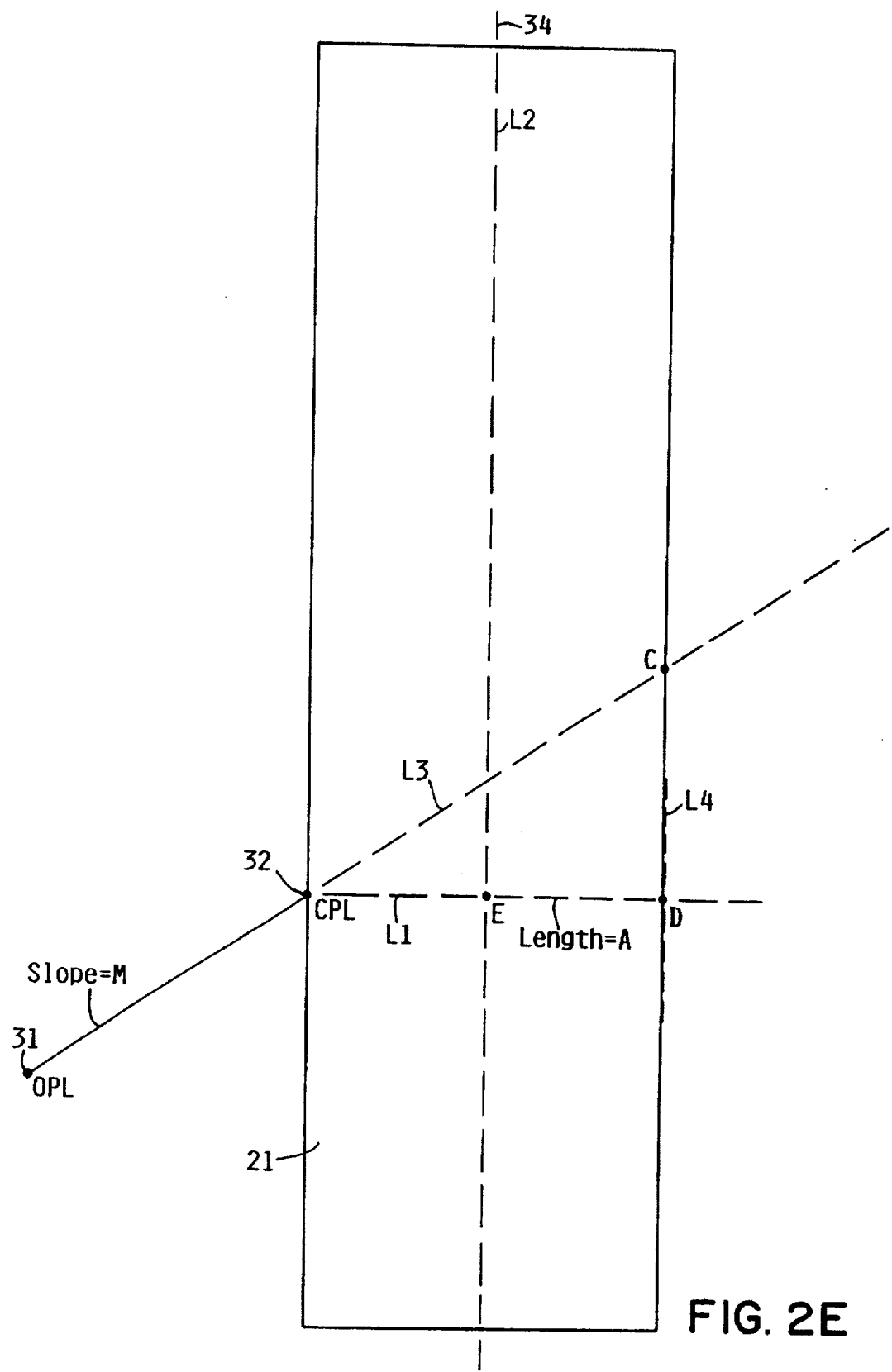
Figure 2F:
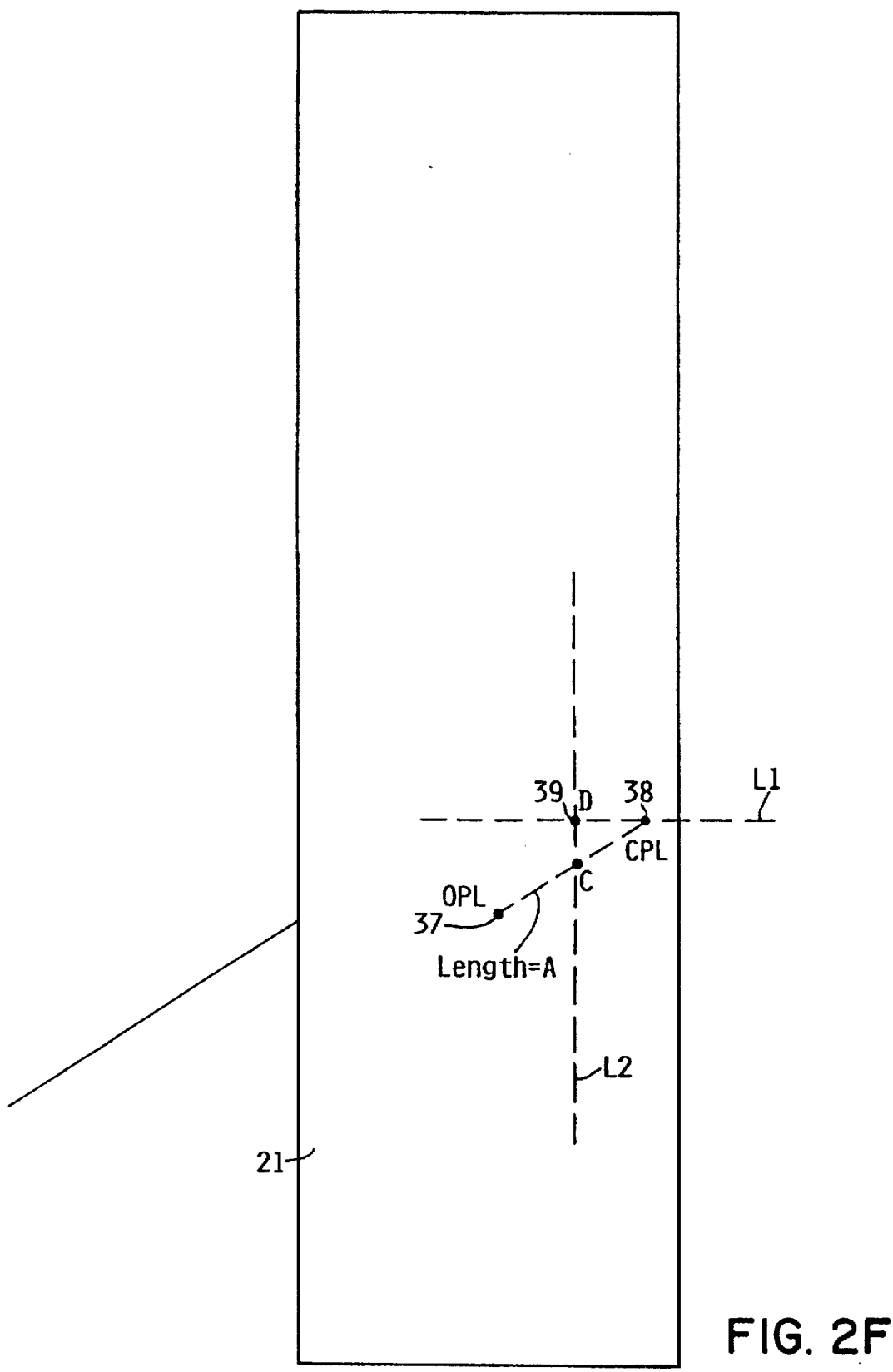
Figure 2G:
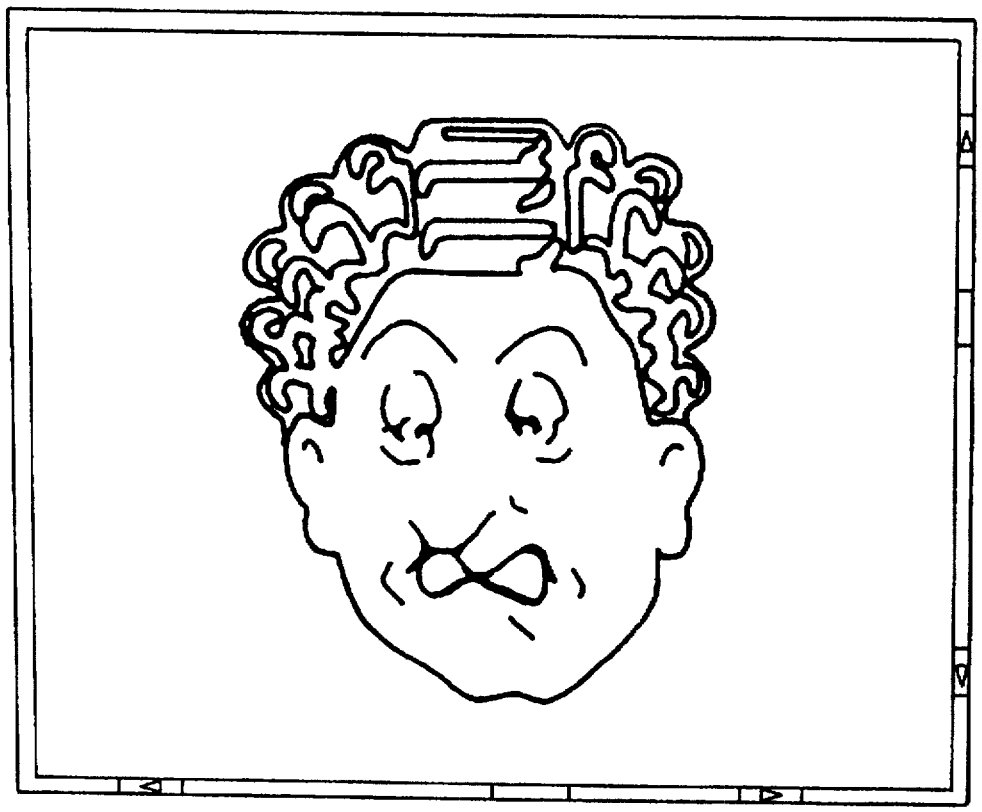
FIG. 2G shows how a scroll bar within a window frame can be implemented using this invention.

Remapping factors between 0.0 and 0.5 may be desirable for skinny regions like window borders, and would actually allow a usable scroll bar to fit within a window border, as is shown in FIG. 2G. Those skilled in the art will appreciate that since OS/2 Presentation Manager already defines scroll bars and window borders as separate windows, that a scroll bar within a window border could be implemented by overlaying portions of the window border window (known as the "frame window") with one or more thin versions of the scroll bar window. This would be especially useful if the "sureness" mode of the invention was used (as will be explained in more detail later), since the pointer would jump to the center of the region with a substantially increased likelihood of staying within that region, yet not affecting the vertical movement through a vertical scroll bar, nor the horizontal movement through a horizontal scroll bar.

FIG. 2D shows remapping factor of 0.5, but shows pointer 30 approaching rectangular region 21 at an angle. Note that, like FIG. 2A, pointer 30 is advanced to point 33. Since region 21 is a vertically elongated region, movement in the vertical direction is not adjusted by the invention. But movement on an angle has both a vertical and a horizontal component, and the horizontal component is adjusted by the invention. In order to allow pointer 30 to exit region 21 at the same angle it entered region 21 (assuming the user is traveling through the region and did not change the direction of travel) pointer 30 is remapped to fall along the line created by points 33 and 35. FIGS. 2E and 2F show how this is done in more detail, and will be discussed later in conjunction with the discussion of the flowcharts of the invention.

FIG. 3A shows region list 40 of FIG. 1 in more detail. In the preferred embodiment, region list 40 is stored in memory 13, although it could also be stored in storage 14. Region list 40 contains information used and updated by the flowcharts of the invention, as will be explained later. Region list 40 is stored in "Z" order, where regions displayed in front of other regions are on the top of the list.

Region type field 41 determines whether the region is a rectangular, circular, square, or "dummy" region. Region ID field 42 assigns an identifier to each region. Complex regions (regions made up of more than one region) are formed by giving each region within the complex region the same identifier in region ID field 42. For complex regions, the identifier given each region may also contain an indication as to whether this is a "strong" or a "weak" ID, as will be discussed later.

Region definitional points field 43 defines the region. For example, a rectangular or square region would be defined by including the x,y coordinates of two opposite corners in field 43. A circular region could be defined by the x,y coordinates of the center of the circle and of a point on the circle. Field 44 defines the x,y coordinates of the axis of the region. For rectangular regions, this field normally stores the end points of the elongated center axis of a rectangular region (such as axis 34 of FIGS. 2A–2F), but could store another axis (such as a diagonal axis to simulate a 3D environment). For complex regions, the axis of the complex region is stored in this field. For square or circular regions, the coordinates of an axis running through the center of the square or circle is normally stored. Field 45 keeps track of the remapping factor for this region. Field 46 keeps track of whether "sureness" or "tracking" is desired for this region. Fields 45 and 46 can take on default values common to all regions, or can be different for different regions.

Figures 3B, 4:
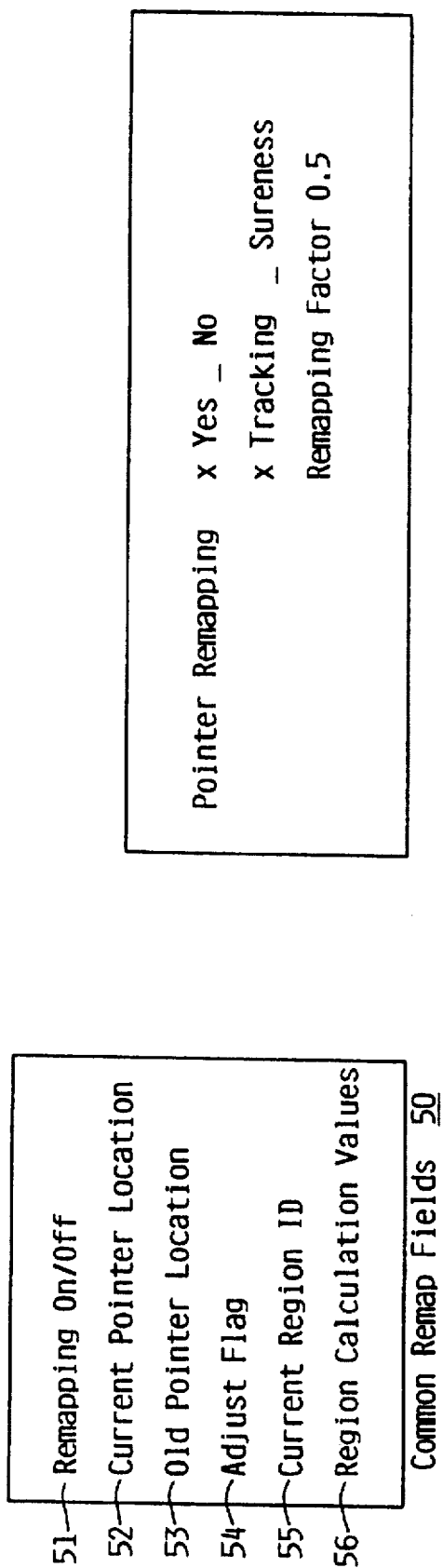
FIG. 3B shows the common region fields of the invention.
FIG. 4 shows an exemplary screen used to set user modifiable parameters of the invention.

FIG. 3B shows common remapping fields 50 of FIG. 1 in more detail. In the preferred embodiment, common remapping fields 50 are stored in memory 13, although they could be stored in storage 14. Field 51 keeps track of whether the user wants pointer remapping of the invention to be on or off. Field 52 stores the current pointer location (CPL), and field 53 stores the old pointer location (OPL). Field 54 keeps track of an adjust flag used by the invention, and field 55 stores the current region ID. Note that fields 45 and 46 of FIG. 3A could have been stored in the common remap fields FIG. 3B, if these fields take on default values common to all regions. Field 56 keeps track of region calculated values. For example, this field stores various points, slopes, and line segments used by the flowcharts to determine jump distances and adjustment values (see FIGS. 2E, 2F, 10, and 11.)

FIG. 4 shows an exemplary screen used to set user modifiable parameters of the invention. Possible user modifiable parameters include whether to set pointer remapping on or off, whether tracking or sureness is desired, and what the value of the remapping factor would be.

FIGS. 5A–5B show the effect of the sureness and tracking parameters on the movement of pointer 30 through region 21 when pointer 30 enters region 21 from the elongated direction of the rectangle. In the preferred embodiment, the user is given the choice of whether tracking (do not alter path through region —the default) or sureness (possibly alter path through region so you can increase likelihood will stay in region) is more important. FIG. 5A shows the path of pointer 30 when tracking is selected and the remapping factor is 0.5. Note that point 33 is halfway between point 32 and the lower right corner of region 22. FIG. 5B shows the path of pointer 30 when sureness is selected and the remapping factor is 0.5. Note that point 33 is on axis 34. Note that the path of pointer 30 is altered in FIG. 5B, but the pointer is more likely to stay within region 21 than FIG. 5A. Note also that FIG. 2D would appear the same regardless of whether tracking or sureness was used.

Figure 6A:
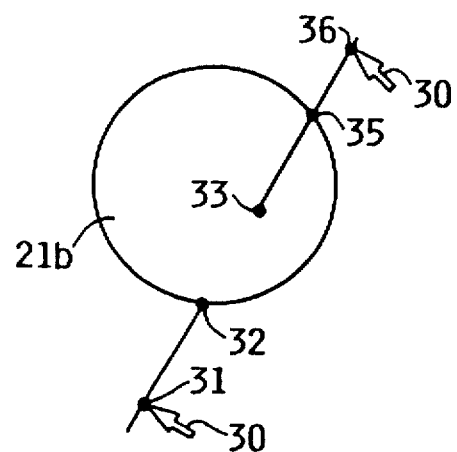
FIGS. 6A–6B show the effect of the sureness and tracking parameters on the movement of an input device pointer through circular regions.
Figure 6B:
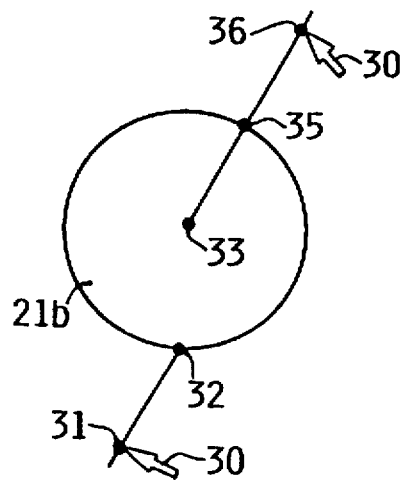

FIGS. 6A–6B show the effect of the sureness and tracking parameters on the movement of pointer 30 through circular regions. FIG. 6A shows path of pointer 30 when tracking is selected and the remapping factor is 0.5. Note that point 33 is halfway between point 32 and the rightmost point of circular region 21b. FIG. 6B shows the path of pointer 30 when sureness is selected and the remapping factor is 0.5.

Note that point 33 is the center of the circle. Note that the path of pointer 30 is altered in FIG. 6B, but the pointer is more likely to stay within region 21b than FIG. 5A. Square regions operate the same way as circular regions.

FIGS. 7A–7D shows how pointer 30 travels through complex region 70. Complex region 70 is made up of square regions 71, 72, and 73, and circular region 74. Regions 71–74 all have the same region ID stored in region ID field 42. This region ID also indicates whether the ID is strong or weak. While this could be done in any number of ways, the preferred embodiment assigns positive values to strong IDs and negative values to weak IDs. Point 75 is the same for all regions 71–74, and is stored in axis field 44.

Figure 7A:
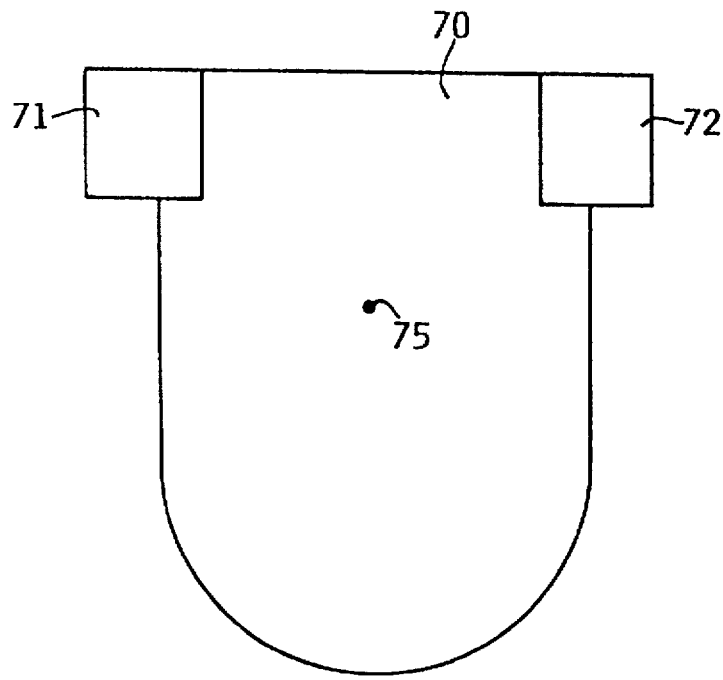
FIGS. 7A–7D shows how an input device pointer travels through a complex region on a computer display.
Figure 7B:
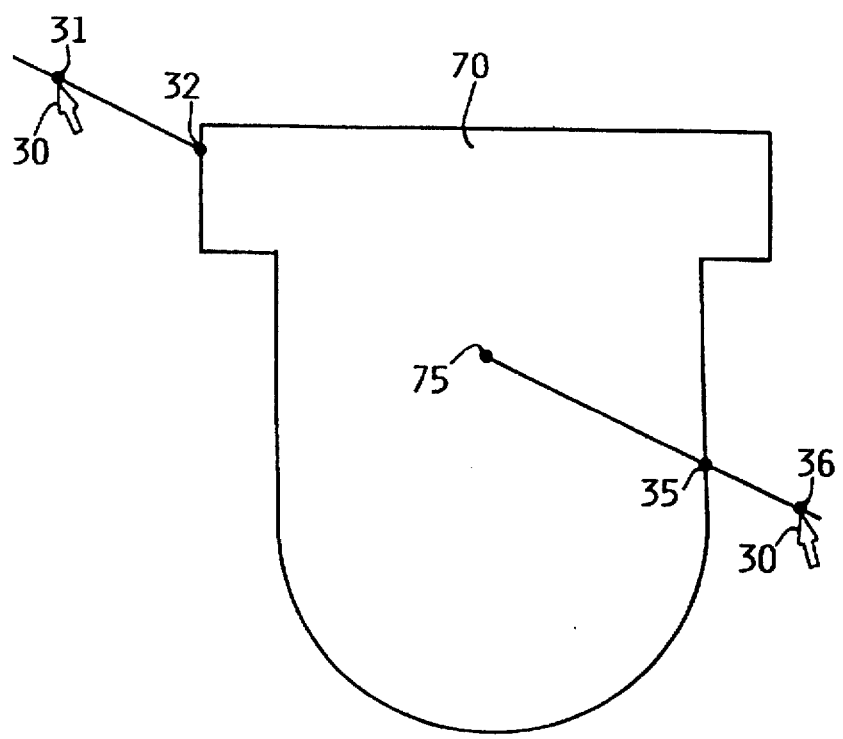
Figure 7C:
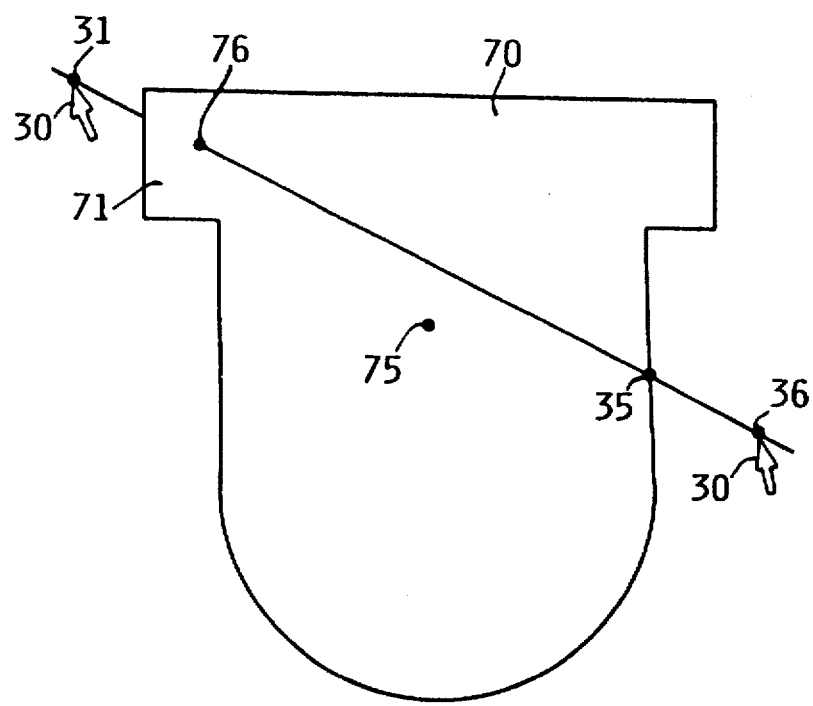
Figure 7D:
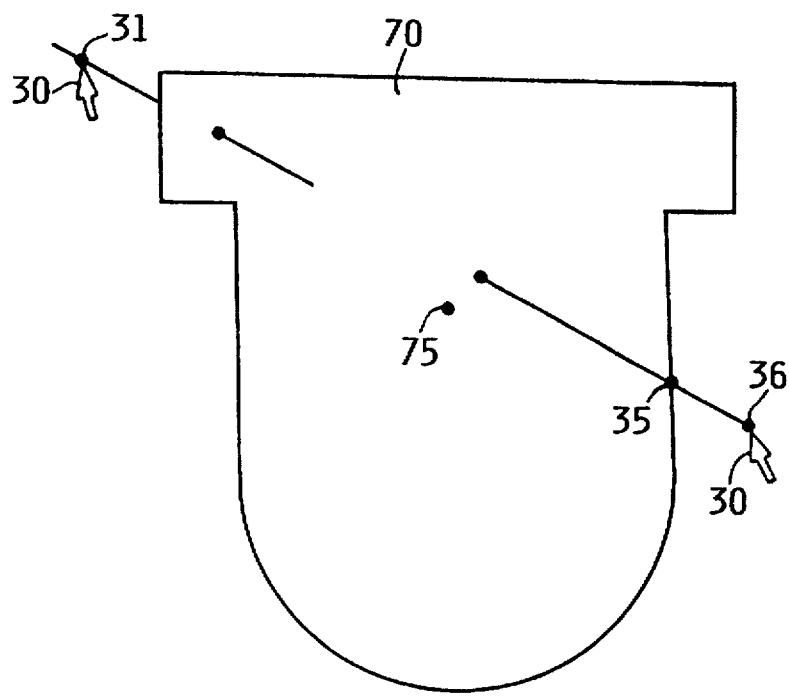

FIG. 7B shows how pointer 30 travels through complex region 70 when sureness is selected, and the ID is either strong or weak. Note that pointer 30 jumps to point 75 of complex region 70, and that the path is altered. FIG. 7C shows how pointer 30 travels through complex region 70 when tracking is selected, and the ID is strong. Note that pointer 30 jumps to point 76 not of complex region 70, but of square region 71. No other jumps are made as pointer 30 enters other regions within complex region 70. FIG. 7D shows how pointer 30 travels through complex region 70 when tracking is selected, and the ID is weak. Note that pointer 30 jumps once again to point 76 of square region 71. Additional jumps are made as pointer 30 enters other regions within complex region 70.

FIG. 7E shows how regions can be defined in the context of a text editor. Note that one region has been defined for each line of text. This makes it easier to use a graphical user interface in a text editor environment, since it increases the likelihood of staying on a desired line to perform an operation, such as move, copy, delete, etc.

FIGS. 8–12 show the flowcharts of the invention. These flowcharts are executed if the user indicated in the screen on FIG. 4 that he wanted pointer remapping to occur. These flowcharts will be discussed in conjunction with the path of pointer 30 through rectangular region 21, as shown in FIGS. 2D–2F. As we enter the flowchart of FIG. 8, we have traveled from point 31 to point 32 in FIG. 2E. Point 31 has been stored as the old pointer location (OPL) in old pointer location field 52 (FIG. 3B) in block 185, as will be discussed later. Block 101 gets the new pointer coordinates. Block 103 saves these coordinates in current pointer location field 52 (FIG. 3B). Therefore, the x,y coordinates (measured in millimeters in the preferred embodiment, with the lower right hand corner of the screen being 0,0) of point 32 are stored as the current pointer location (CPL). Block 105 checks to see if adjust flag 54 (FIG. 3B) is on. Since this flag has not been set on yet, block 105 is answered negatively. Block 200a calls the Determine if Current Pointer Location is in a Region Subroutine 200 of FIG. 9.

Figure 8A:
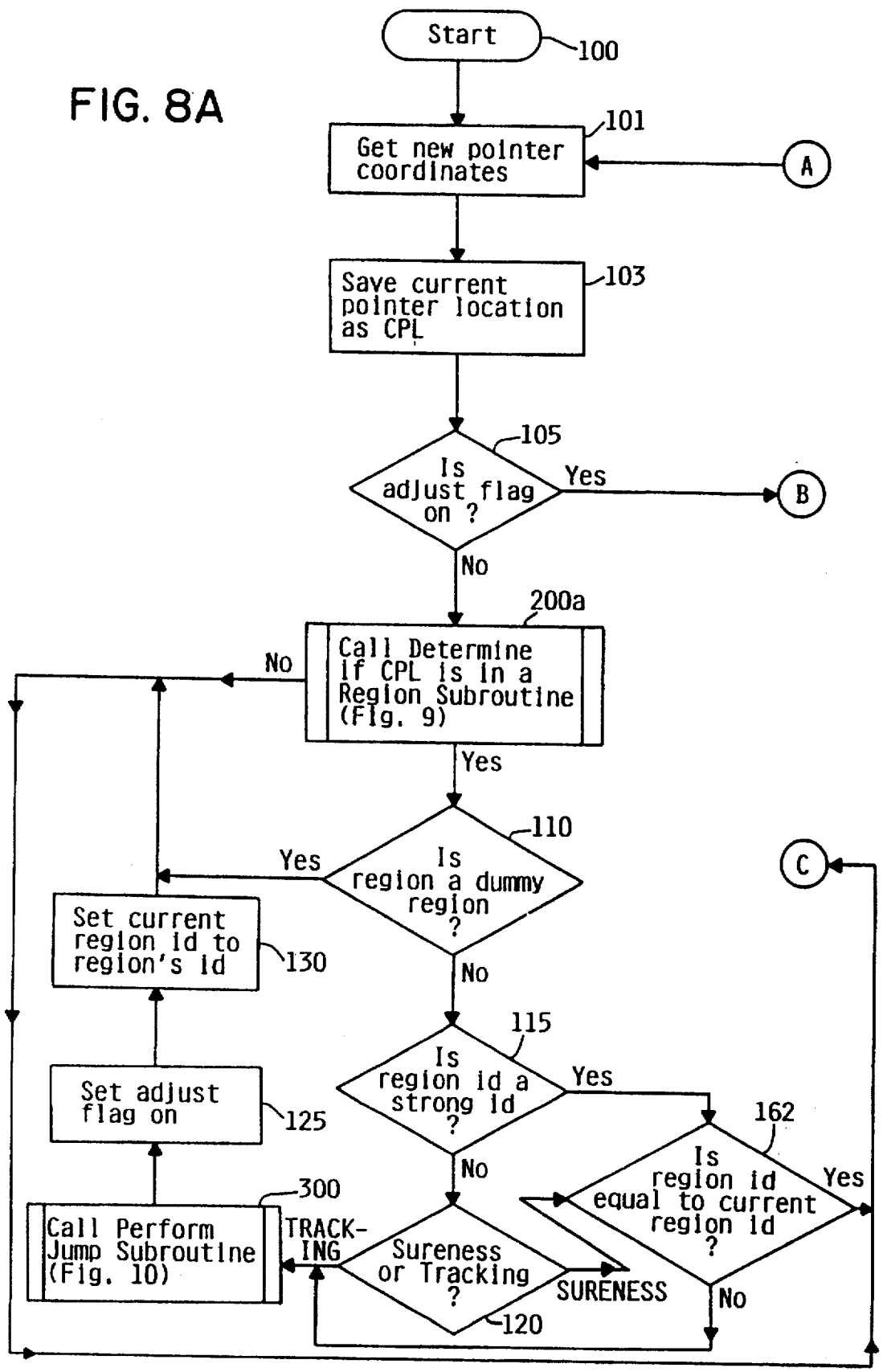
FIGS. 8–12 show the flowcharts of the invention.
Figure 8B:
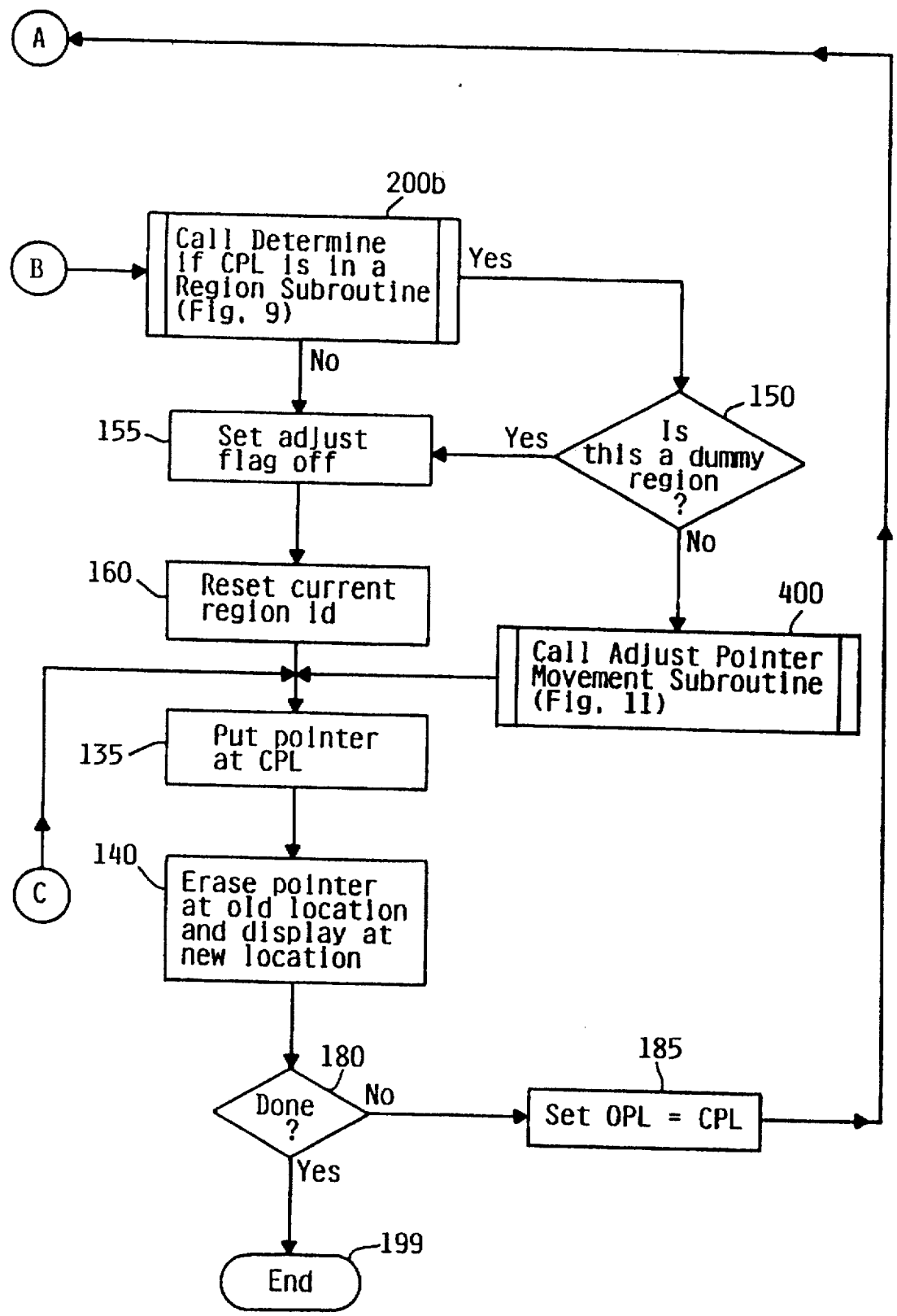
Figure 9:
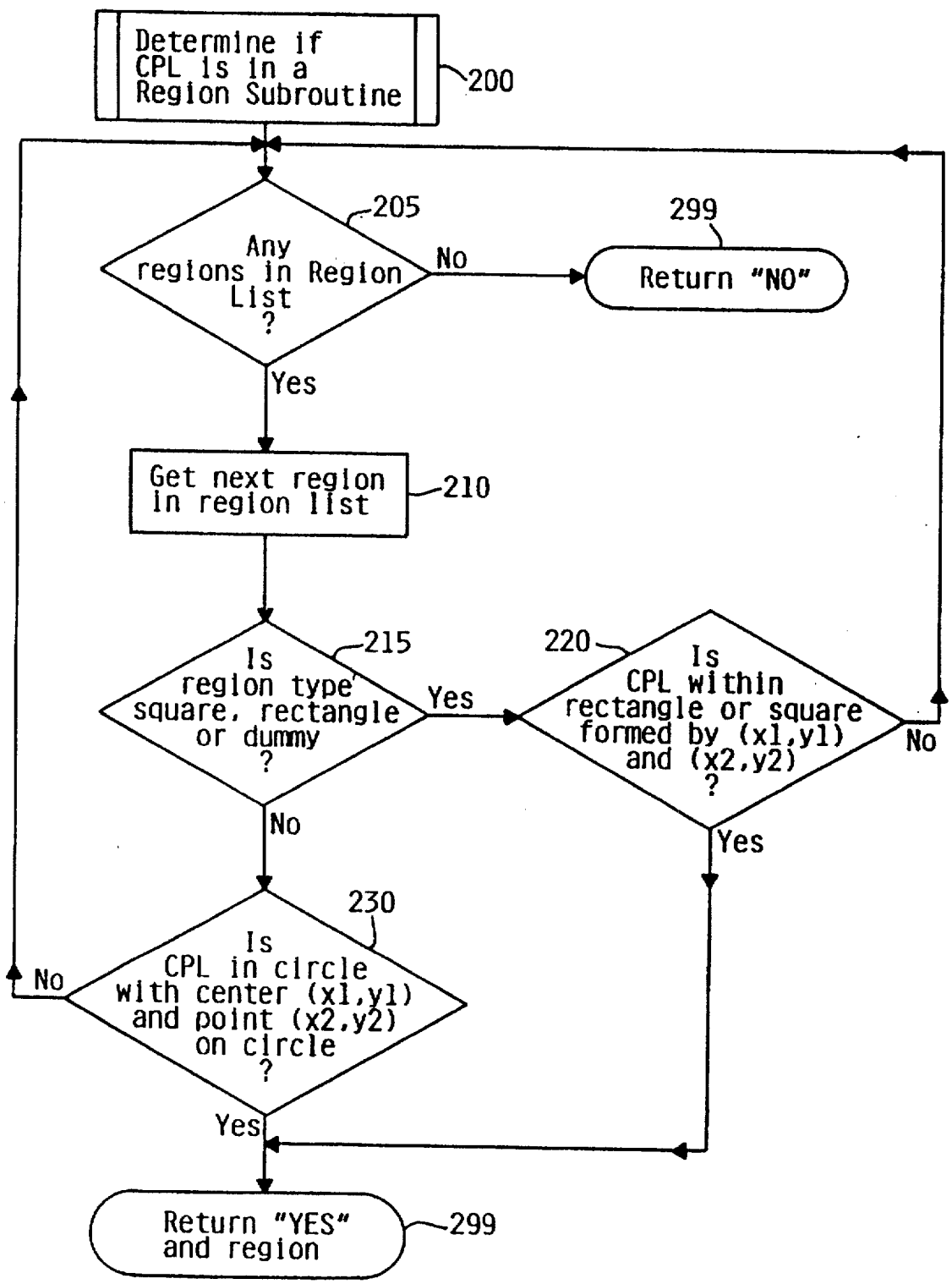

Referring now to FIG. 9, block 205 checks to see if there are any regions in the region list of FIG. 3A that have not been checked yet. If so, block 210 gets the next region in the region list. In our example, the entry for region 21 would be selected. Block 215 checks to see if the region type is a square, rectangle, or "dummy" (discussed later). Since our region is a rectangle, block 215 is answered affirmatively, and block 220 checks to see if the CPL is within the rectangle or square formed by coordinates 43 stored in the region list. Since point 32 is within region 21 (FIG. 2E), block 220 is answered affirmatively. The subroutine then returns a "YES" value to block 200a of FIG. 8, along with the selected region in which the pointer was determined to reside.

If block 220 determined that the CPL was not within a region, flow of control would loop back to block 205 to see if there were any more regions to look at. If there were no more regions, or if the CPL was not in any region, block 205 would be answered negatively, and a "NO" value be returned to block 200a of FIG. 8. If the region was a circle, block 230 would check to see if the CPL was within the circle by looking at the center point and a point on the circle.

Since in our example the CPL is within a region, a "YES" value is returned to block 200a in FIG. 8, and flow of control moves to block 110 to see if the region is a dummy region. Since our region is a rectangular region, block 110 is answered negatively. Block 115 asks if the region ID is a strong ID. Since only complex regions have strong IDs, as will be discussed later, block 115 is answered negatively. Block 120 asks if sureness or tracking was selected. Since we selected tracking in FIG. 4, Perform Jump Subroutine 300 of FIG. 10 is called.

Figure 10A:
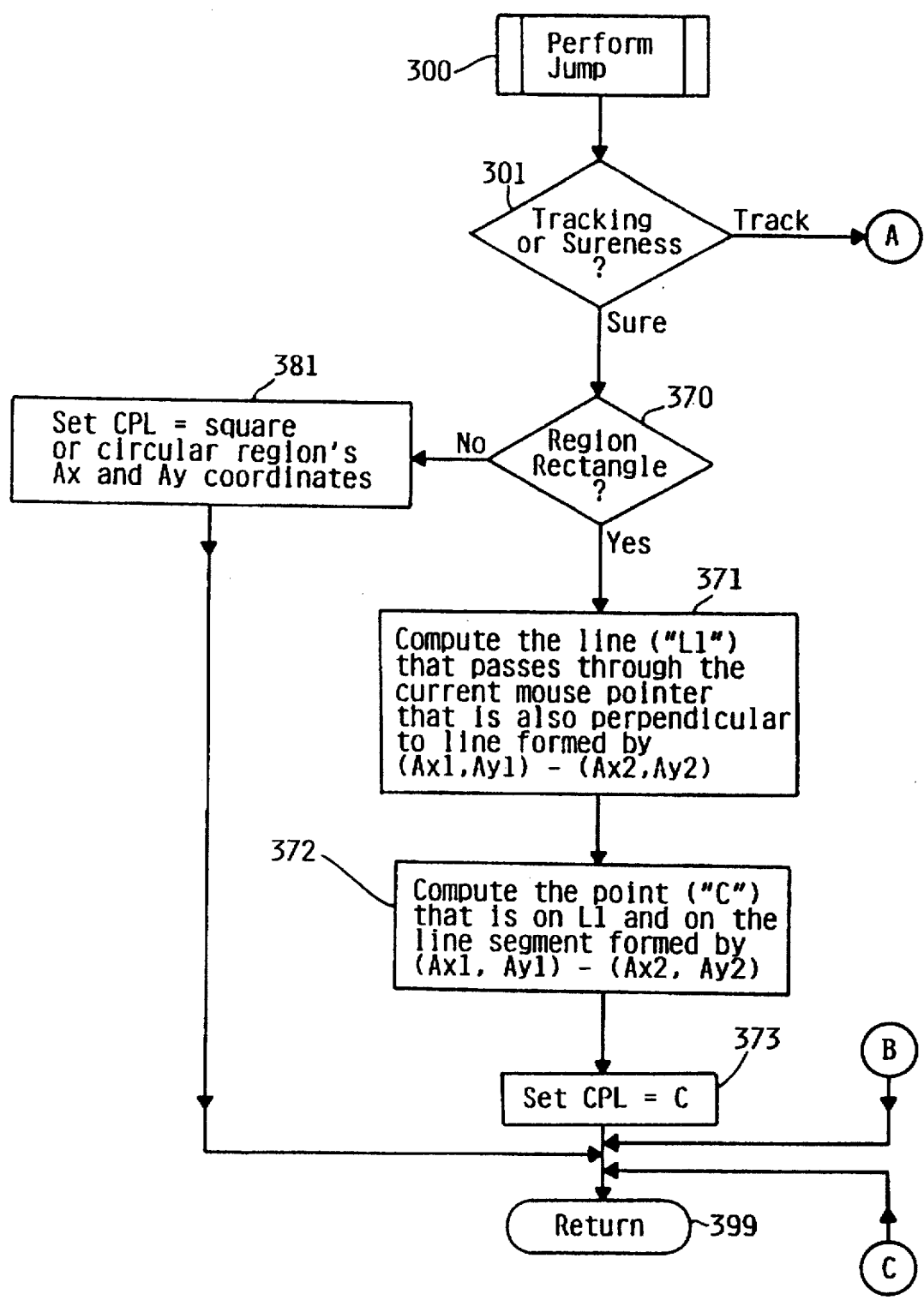
Figure 10B:
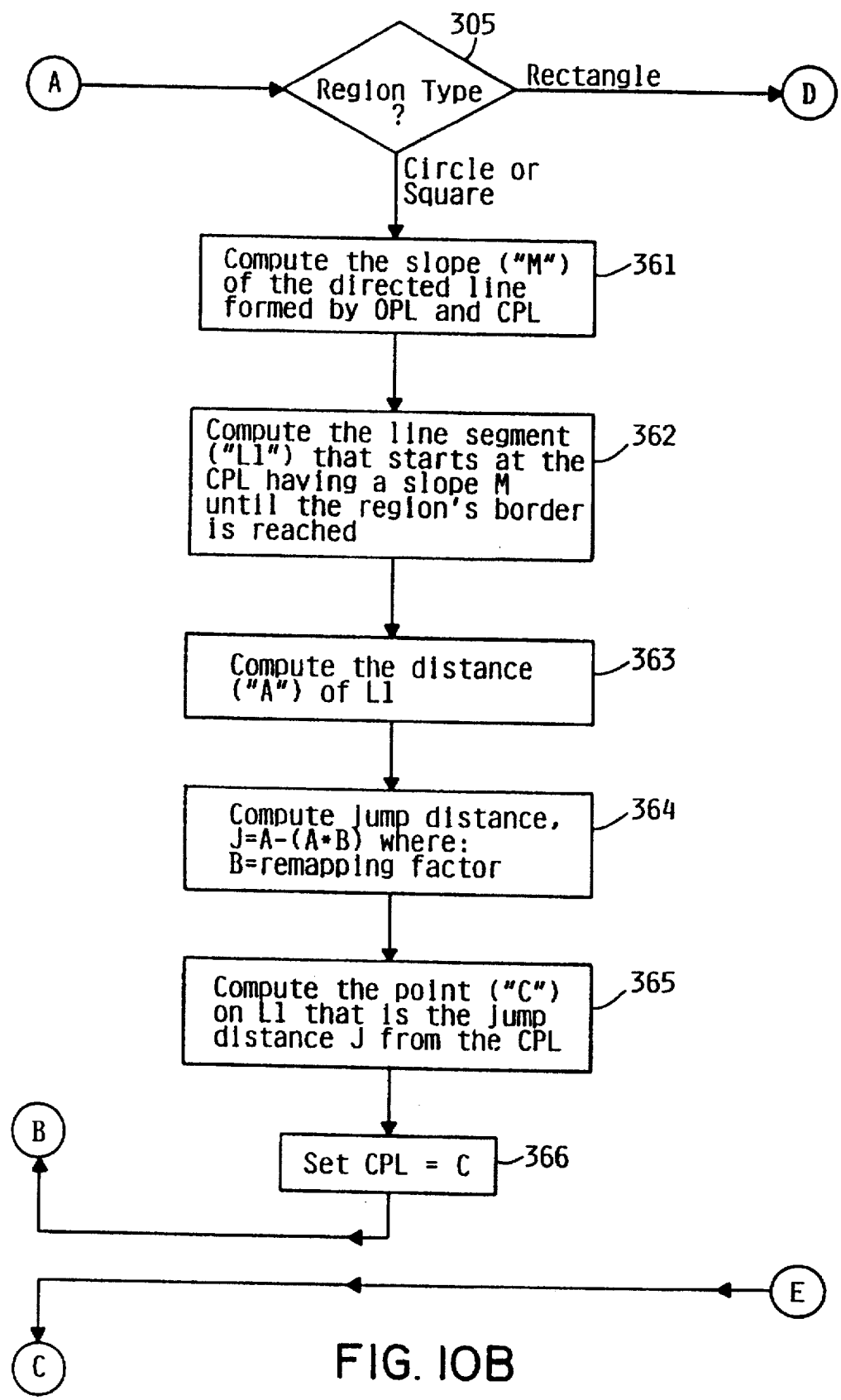
Figure 10C:
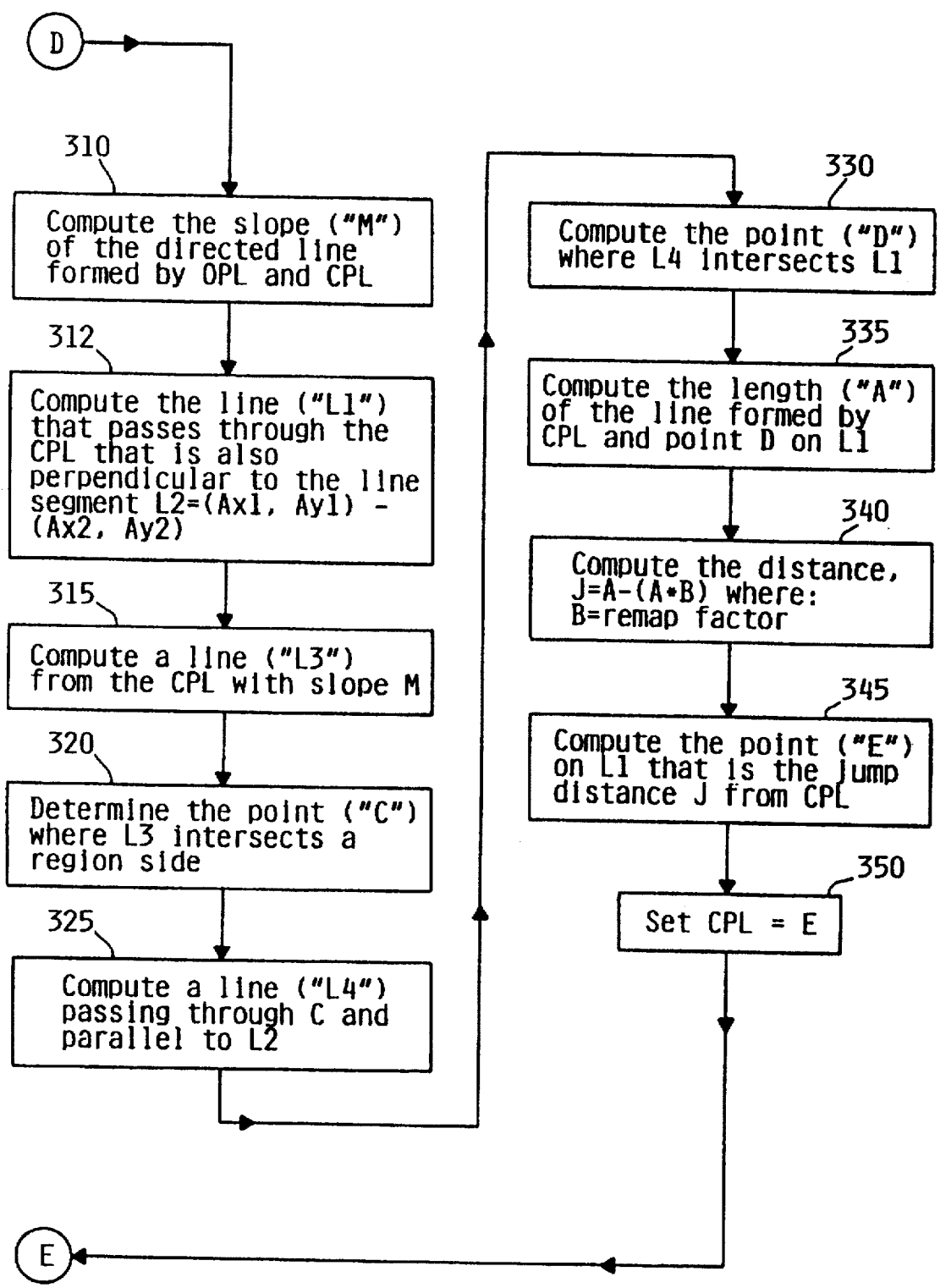

Referring now to FIG. 10, block 301 asks if sureness or tracking was selected. Since we selected tracking, block 305 checks to see if the region was a circle, square, or rectangle. Since our region was a rectangle, flow of control moves to block 310. Block 310 computes the slope of the line between the OPL and the CPL, as shown in FIG. 2E. Block 312 computes the line L1 that passes through the CPL and is perpendicular to the line segment L2 created by axis 34. Lines L1 and L2 are shown in FIG. 2E. Block 315 computes a line L3 from the CPL with slope M. Line L3 is shown in FIG. 2E. Block 320 computes the point C where L3 intersects a region side. Point C is shown in FIG. 2E. Block 325 computes a line L4 passing through point C and parallel to L2. Line L4 is shown in FIG. 2E. Block 330 computes the point D where L4 intersects L1. Point D is shown in FIG. 2E. Block 335 computes length A of the line formed by CPL and point D of L1. The length A of this line is shown in FIG. 2E. Block 340 computes the point C where L3 intersects a region side. Block 340 computes the jump distance J=A-(A*B), where A is the length of the line formed by CPL and point D, and B is the remapping factor stored in field 45. Since our remapping factor is 0.5, the distance computed in step 340 is A/2. Block 345 computes point E on line L1 that is the jump distance from CPL. Point E is shown in FIG. 2E. Block 350 sets CPL=E, and the subroutine returns in block 399 to block 125 in FIG. 8. The values for all of these line segments, line length, slopes, and points are stored for use during the calculation process in field 55 (FIG. 3B).

If block 315 determined that the region type was a square or a circle (as in FIG. 6A), blocks 361–366 are executed instead of blocks 310–350. Blocks 361–366 are similar, but not as complex, as blocks 310–350 just discussed. If block 301 determined that sureness was selected and the region type was a rectangle (as in FIG. 5B), even easier calculations are performed in blocks 371–373. If sureness is selected and the region type is a square or a circle (as in FIG. 6B), block 381 simply sets CPL equal to the coordinates of the axis of the square or circle, as stored in field 44. Regardless of the region type or whether tracking or sureness was selected, the subroutine returns in block 399 to block 125 in FIG. 8.

Referring again to FIG. 8, block 125 sets adjust flag on in region field 54 of FIG. 3B. Block 130 copies the region ID from field 45 into current region ID field 55 (FIGS. 3A–3B). Block 135 puts the pointer at the new CPL (point E, determined by block 350 in our example). Block 140 erases the old pointer from the display screen and displays the new pointer at the CPL. Block 180 checks to see if it has received an indication from the system that all windows have been closed. If so, the program ends in block 199. If not, as is the case with our example, flow of control loops back to block 185.

Block 185 saves the CPL in field 52 as the old pointer location (OPL) in field 53. FIG. 2F now shows the former point E from FIG. 2E as the OPL (location 37). As can be seen in FIG. 2F, the pointer has moved to a new location 38. Block 101 again gets the coordinates of the new location. Block 103 saves these coordinates in current pointer location field 52 (FIG. 3B). Block 105 checks to see if adjust flag 54 (FIG. 3B) is on. Since this flag was set on in block 125, block 105 is answered affirmatively, and block 200b calls the Determine if Current Pointer Location is in a Region Subroutine 200 of FIG. 9, as has been discussed. Since the CPL is still within a region, a "YES" value is returned from this subroutine, along with the region. Block 150 asks if this is a dummy region. Since our region is rectangular, block 150 is answered negatively, and Adjust Pointer Movement Subroutine 400 of FIG. 11 is called.

Figure 11:
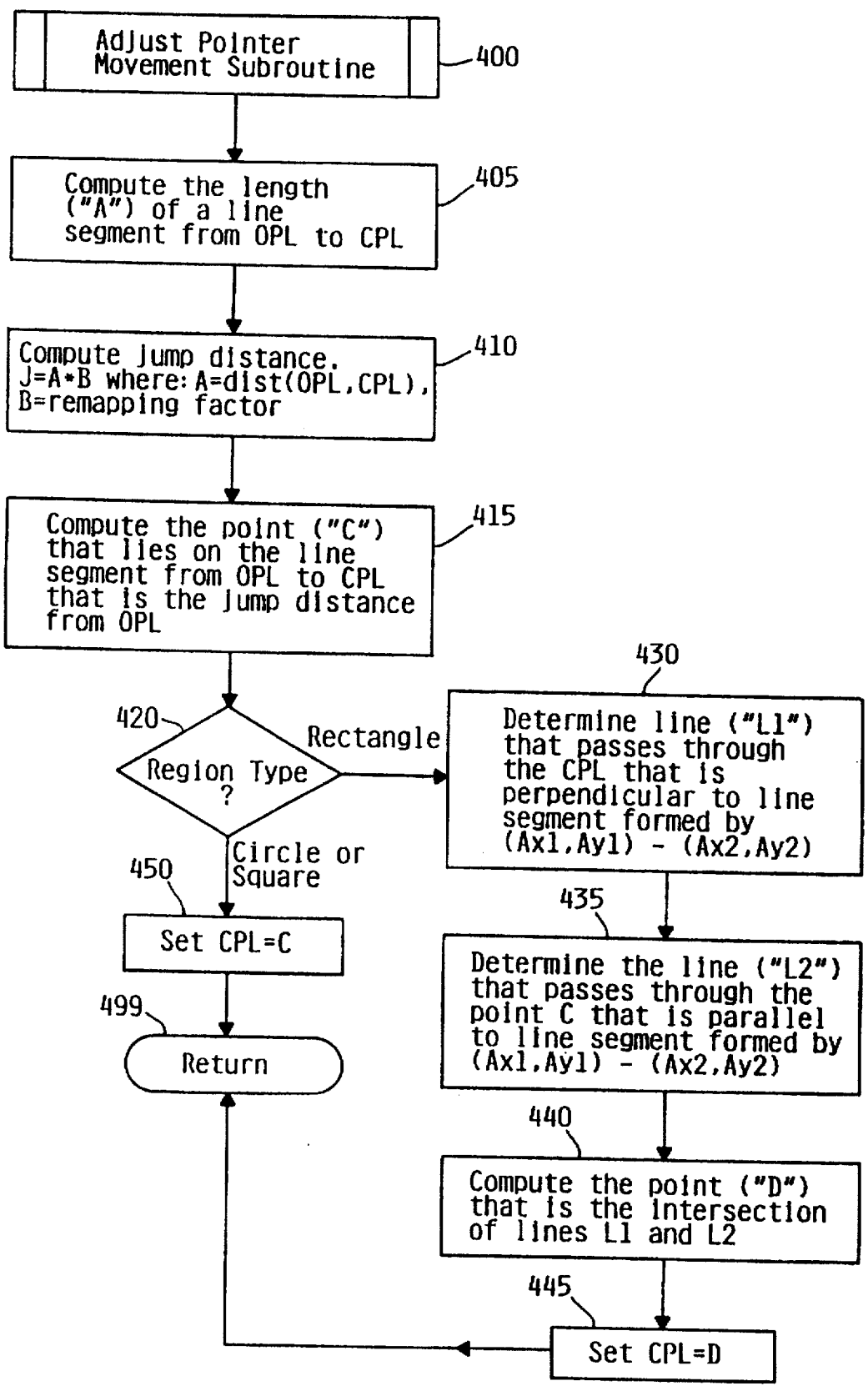

FIG. 11 will be discussed in conjunction with FIG. 2F. Referring now to FIG. 11, block 405 computes length A of a line segment from OPL to CPL. This is shown in FIG. 2F. Block 410 computes the jump distance J=A*B, where A is the length computed in block 405, and B is the remapping factor stored in field 45. Since our remapping factor was set to 0.5 in FIG. 4, the jump distance is halfway between OPL and CPL. Block 415 computes point C that is the jump distance from OPL. This is shown in FIG. 2F. Block 420 checks to see if the region is a rectangle or a square or circle. Since our region is a rectangle, flow of control moves to block 430. Block 430 determines the line L1 that passes through the CPL that is perpendicular to the line segment formed by the axis points (Ax1, Ay1)–(Ax2, Ay2), as stored in field 44. Line L1 is shown in FIG. 2F. Block 435 determines the line L2 that passes through point C that is parallel to the line segment formed by the axis points (Ax1, Ay1)–(Ax2, Ay2), as stored in field 44. Line L2 is shown in FIG. 2F. Block 440 computes point D that is at the intersection of lines L2 and L1, as shown in FIG. 2F. Block 445 sets CPL=D, therefore adjusting the pointer location from point 38 to point 39. Point 39 is also shown in FIG. 2D. Since in the preferred embodiment pointer location 38 is never written to the display, the user is not even aware that his pointer has been adjusted from point 39 to point 38. All he knows is that the likelihood of remaining in the region has increased. The subroutine returns in block 499 to block 135 in FIG. 8, which has already been discussed. If block 420 had determined that the region was a square or circle, block 450 would simply set CPL=C, as determined in block 415, before returning in block 499.

Once pointer 30 exits region 21 (as shown by point 35 in FIG. 2D), subroutine 200 passes a "NO" value back to block 200b, and flow of control moves to block 155. Block 155 sets adjust flag field 54 to off to indicate that the region was exited. Block 160 resets current region ID field 55 to a null or blank value. Blocks 135 and 140 are executed, but merely display the pointer at the new location without adjustment. Subsequent pointer movements (such as to point 36 of FIG. 2D) result in a "NO" value being returned to block 200a, and the re-execution of blocks 135 and 140. Once all windows have closed, block 180 is answered affirmatively, and the program ends in block 199.

Figure 12:
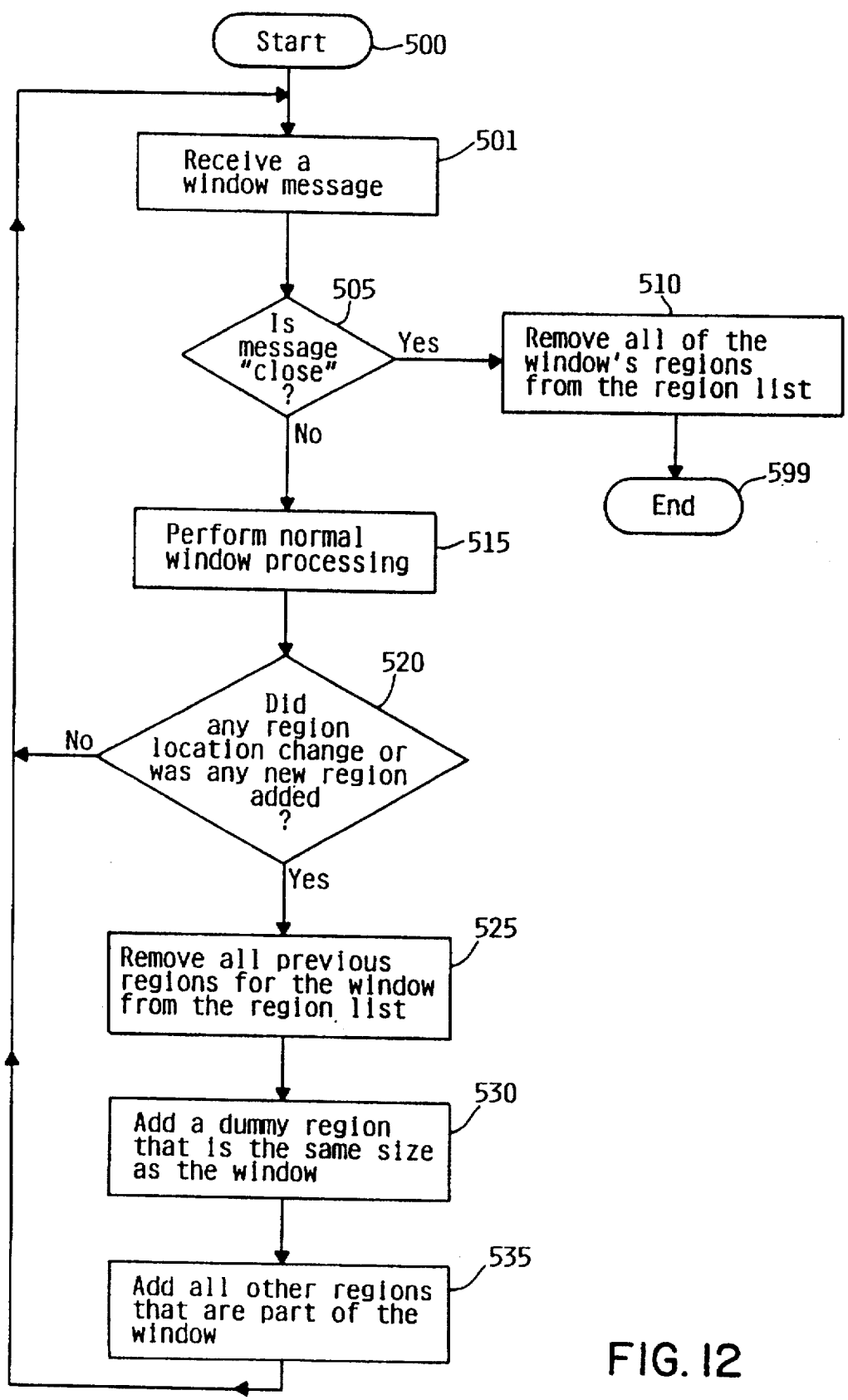

The flowchart of FIG. 12 executes independently from the flowcharts discussed above, and handles window messages. Block 501 receives a window message. In the preferred embodiment, these window messages are received from the section of the operating system responsible for managing such messages, such as Presentation Manager for OS/2. Block 505 checks to see if the message received was to close the window. If so, block 510 removes all of the regions in the window to be closed from the region list of FIG. 3A, and the program ends in block 599. If the message is not to close the window, normal window processing is performed in block 515. Block 520 checks to see if a new region was added, or if a region location was changed, such as if the entire window was moved to a different location on the screen. If not, flow of control returns to block 501. If so, block 525 removes all previous regions for this window from the region list in FIG. 3A. Block 530 adds a dummy region that is the same size as the window. This is done so that regions in the region list below this region (i.e. regions belonging to other windows) are not searched. Block 535 adds all other regions that are part of this window to the region list in FIG. 3A.

While this invention has been described with respect to the preferred embodiment and several alternate embodiments, it will be understood by those skilled in the art that various changes in detail may be made therein without departing from the spirit, scope and teaching of the invention. For example, two remapping factors could be used— one to perform the initial jump, and the second to calculate the adjustment within the region. Accordingly, the herein disclosed is to be limited only as specified in the following claims.

What is claimed is:

1. A method for remapping a pointer for an input device when said pointer is within a region on a computer display, comprising the steps of:

determining that said pointer is within said region;

advancing said pointer by jumping said pointer to an adjusted location within said region;

repeatedly receiving an indication from said input device that said pointer has moved to another location within said region; and restricting advancement of said pointer by repeatedly remapping said pointer from said another location to a new adjusted location within said region.

2. The method of claim 1, wherein said advancing and said restricting steps cooperate to ensure that when a user instructs said input device to move said pointer through and beyond said region that progress of said pointer is unaffected while nonetheless increasing the likelihood that said pointer remains within said region when said user instructs said input device to move said pointer within said region.

3. The method of claim 1, further comprising the step of: selecting a remapping factor.

4. The method of claim 2, wherein said advancing step advances said pointer through said region by the length of said region minus the product of the length of said region and said remapping factor, and wherein said restricting step selects said new adjusted location to be the distance from said adjusted location to said another location multiplied by said remapping factor.

5. The method of claim 4, wherein said remapping factor is equal to one half, and wherein said advancing step advances said pointer halfway through said region, and wherein said restricting step selects said new adjusted location to be half the distance from said adjusted location to said another location, thereby allowing said input device to travel through said region unaffected when said user instructs said input device to cause said pointer to travel through said region while nonetheless increasing the likelihood that said pointer remains within said region when said user instructs said input device to move said pointer within said region.

6. The method of claim 4, wherein said remapping factor is less than one half, and wherein said advancing step advances said pointer more than halfway through said region, and wherein said restricting step selects said new adjusted location to be less than one half the distance from said adjusted location to said another location, thereby allowing said input device to travel through said region unaffected when said user instructs said input device to cause said pointer to travel through said region while nonetheless increasing the likelihood that said pointer remains within said region when said user instructs said input device to move said pointer within said region.

7. The method of claim 4, wherein said remapping factor is more than one half, and wherein said advancing step advances said pointer less than halfway through said region, and wherein said restricting step selects said new adjusted location to be more than one half the distance from said adjusted location to said another location, thereby allowing said input device to travel through said region unaffected when said user instructs said input device to cause said pointer to travel through said region while nonetheless increasing the likelihood that said pointer remains within said region when said user instructs said input device to move said pointer within said region.

8. A computer system for remapping a pointer for an input device when said pointer is within a region on a computer display, comprising:

means for determining that said pointer is within said region;

means for advancing said pointer through said region by jumping said pointer to an adjusted location within said region;

means for repeatedly receiving an indication from said input device that said pointer has moved to another location within said region; and means for restricting the advancement of said pointer through said region by repeatedly adjusting said pointer from said another location received from said input device by said receiving means to a new adjusted location within said region.

9. A method for implementing a vertical scroll bar within a narrow window border, comprising the steps of:

determining that a pointer for an input device is within said vertical scroll bar;

advancing said pointer through said vertical scroll bar by horizontally jumping said pointer to an adjusted location within said vertical scroll bar;

repeatedly receiving an indication from said input device that said pointer has moved to another horizontal location within said vertical scroll bar; and restricting the horizontal advancement of said pointer through said vertical scroll bar by repeatedly adjusting said pointer from said another location received from said input device during said receiving step to a new adjusted location within said vertical scroll bar.

10. The method of claim 9, further comprising the step of:

allowing unrestricted vertical advancement of said pointer through said vertical scroll bar.

11. The method of claim 10, wherein said advancing and said restricting steps cooperate to ensure that when a user instructs said input device to move said pointer through and beyond said region that progress of said pointer is unaffected while nonetheless increasing the likelihood that said pointer remains within said region when said user instructs said input device to move said pointer within said region.

12. A method for using a horizontal scroll bar within a narrow window border, comprising the steps of:

determining that a pointer for an input device is within said horizontal scroll bar;

advancing said pointer through said horizontal scroll bar by vertically jumping said pointer to an adjusted location within said horizontal scroll bar;

repeatedly receiving an indication from said input device that said pointer has moved to another vertical location within said horizontal scroll bar; and restricting the vertical advancement of said pointer through said horizontal scroll bar by repeatedly adjusting said pointer from said another location received from said input device during said receiving step to a new adjusted location within said horizontal scroll bar.

13. The method of claim 12, further comprising the step of:

allowing unrestricted horizontal advancement through said horizontal scroll bar.

14. The method of claim 13, wherein said advancing and said restricting steps cooperate to ensure that when a user instructs said input device to move said pointer through and beyond said region that progress of said pointer is unaffected while nonetheless increasing the likelihood that said pointer remains within said region when said user instructs said input device to move said pointer within said region.

* * * * *